United States Patent [19]

Chien

[11] Patent Number: 5,076,177
[45] Date of Patent: Dec. 31, 1991

[54] SIMPLY-CONSTRUCTED DETACHABLE DISPLAY SHELF

[76] Inventor: Chin-Tien Chien, c/o Hung Hsing Patent Service Center, P.O. Box 55-1670, Taipei, Taiwan

[21] Appl. No.: 689,544

[22] Filed: Apr. 23, 1991

[51] Int. Cl.⁵ .............................................. A47B 3/00
[52] U.S. Cl. .................................. 108/111; 108/107; 211/135
[58] Field of Search ................. 108/111, 91, 153, 107; 211/135, 188, 194; 312/108, 264, 265

[56] References Cited

U.S. PATENT DOCUMENTS

| 2,909,289 | 10/1959 | Laurie | 108/107 X |
| 3,070,239 | 12/1962 | Deitchman | 108/107 X |
| 3,704,792 | 12/1972 | Wise | 108/91 X |
| 3,856,374 | 12/1974 | Christen | 317/264 X |
| 3,862,691 | 1/1975 | Mori et al. | 108/111 X |
| 4,228,743 | 10/1980 | Crook | 108/91 X |
| 4,664,040 | 5/1987 | Levenberg | 108/111 |
| 4,821,649 | 4/1989 | Andersson | 108/111 X |

FOREIGN PATENT DOCUMENTS

| 495836 | 9/1977 | Australia | 108/111 |
| 1190190 | 7/1985 | Canada | 312/108 |
| 515258 | 11/1939 | United Kingdom | 211/135 |

Primary Examiner—Jose V. Chen

[57] ABSTRACT

A display shelf includes at least two side panels each panel formed with a plurality of gripping plates on the side panel, and a plurality of horizontal planks each plank formed with a plurality of side lugs each lug interlockably snapped on each gripping plate formed on the side panel so that the horizontal planks can be easily mounted on the side panels without requiring any fixing element or tool for a convenient assembly or dismantling work of the shelf.

2 Claims, 5 Drawing Sheets

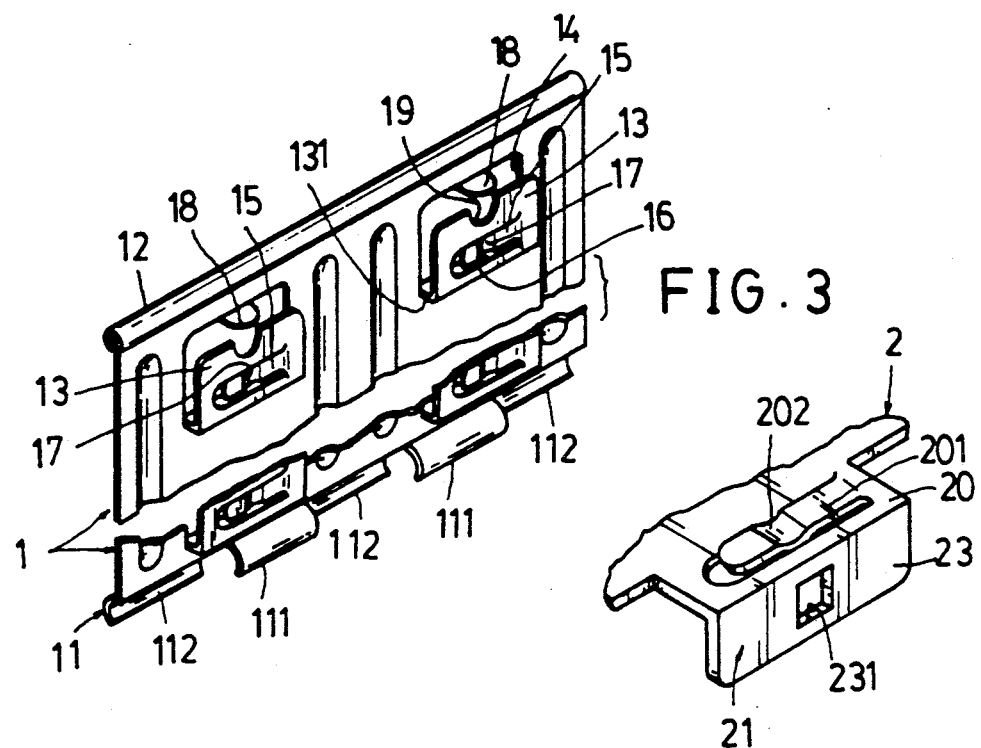
FIG. 3
FIG. 6a
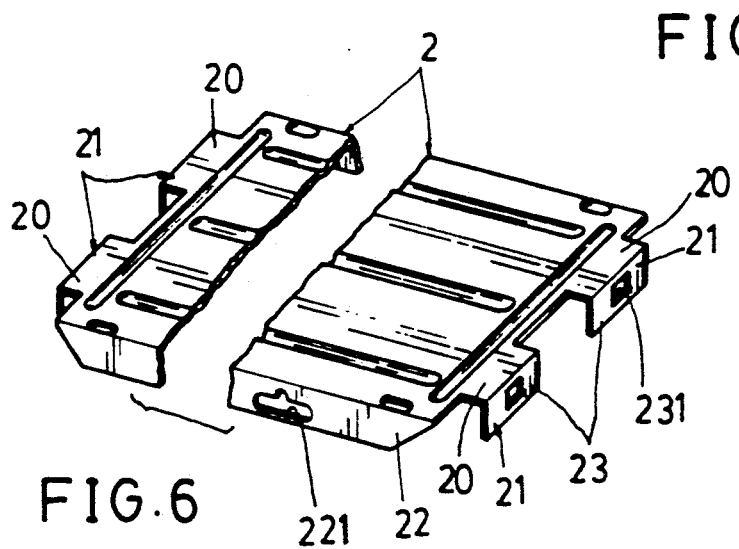
FIG. 6

SIMPLY-CONSTRUCTED DETACHABLE DISPLAY SHELF

BACKGROUND OF THE INVENTION

A conventional shelf or display stand used for displaying commercial samples or products is always formed by assembling several vertical columns or side panels with plural horizontal plates by means of fixing elements or by engagement of tenons with sockets of the corresponding assembly parts formed in the relevant columns, side panels and the horizontal plates. Such a conventional shelf may have the following drawbacks:

1. Fixing elements such as screws, bolts, nails, rivets or other parts should be provided for assembling the relevant panels and plates of a shelf by means of tools, causing an inconvenient assembly and increasing its installation cost.

2. If the shelf is transported or handled as completely assembled, a gigantic skeleton of the assembled shelf will influence its handling operation or increase transporation cost.

3. It may cause an inconvenient assembly for use or cause a time-consuming dismantling job for handling or storage purpose.

The present inventor has found the drawbacks of the conventional shelf and invented the present simply-constructed shelf which can be easily dismantled or assembled.

SUMMARY OF THE INVENTION

The object of the present invention is to provide a display shelf including at least two side panels each panel formed with a plurality of gripping plates on the side panel, and a plurality of horizontal planks each plank formed with a plurality of side lugs each lug interlockably snapped on each gripping plate formed on the side panel so that the horizontal planks can be easily mounted on the side panels without requiring any fixing element or tool for a convenient assembly or dismantling work of the shelf.

BRIEF DESCRIPTION OF THE DRAWINGS

FIG. 3 is a partial perspective view of the side panel of the present invention.

FIG. 6 is a partial perspective view of the horizontal plank of the present invention.

FIG. 6A shows another preferred side lug in accordance with the present invention.

DETAILED DESCRIPTION

As shown in FIGS. 1-6, a shelf of the present invention is assembled by at least two side panels 1 and a plurality of horizontal planks 2. Each horizontal plank 2 is horizontally mounted between two side panels 1.

Figures 1, 2:
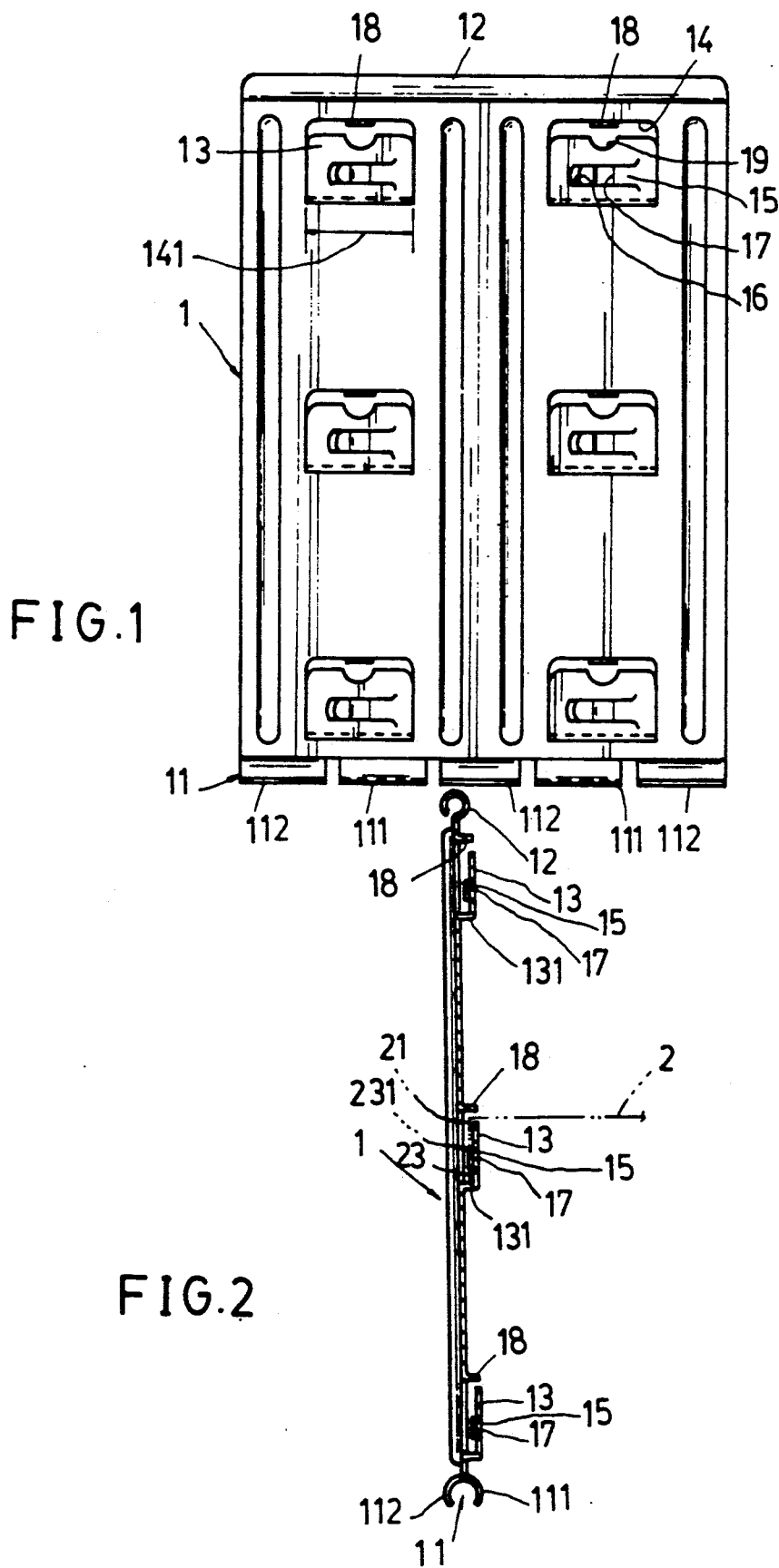
FIG. 1 is an elevational front view of a side panel of the present invention.
FIG. 2 is a side view of the side panel of the present invention.

Each side panel 1 as shown in FIGS. 1-3 includes: a supporting clip 11 formed on a base portion of the side panel 1, a securing crimp 12 formed on an upper portion of the side panel 1 engageable with another supporting clip 11 formed on another side panel 1 for overlapping two side panels 1, and at least two gripping plates 13 formed on the side panel 1.

The supporting clip 11 includes a plurality of first leaf portion 111 respectively arcuately protruding inwardly from a lower portion of the side panel 1, and a plurality of second leaf portion 112 respectively arcuately protruding outwardly from the lower portion of the side panel, each first leaf portion 111 being adjacent to each second leaf portion 112 to form an arcuate clip when projectively viewed from a side view of the side panel 1.

The securing crimp 12 formed on an upper portion of the side panel 1 is generally formed as a cylindrical tube or rod engageable with the supporting clip.

Each gripping plate 13 having a longitudinal section generally L-shaped includes: a base portion 131 protruding inwardly from the side panel 1 for integrally connecting the gripping plate 13 generally perpendicular to the base portion 131 and parallel to the side panel 1, a spring plate 15 resiliently secured to the gripping plate 13 having a convex portion 17 protruding outwardly from the gripping plate 13, and an upper stopper 18 formed on the side panel 1 above the gripping plate 13.

The gripping plate 13 can be directly punched or stamped from the side panel 1 to form a gripping-plate opening 14 in the side panel, and the spring plate 15 is directly punched from the gripping plate 13 to form a control slot 16 in the gripping plate 13, and the upper stopper 18 is directly punched from the side panel 1 to form a stopper notch 19 in the gripping plate 13 when punching the side panel 1 to form the gripping plate 13. The upper stopper 18 is secured to an upper edge of the gripping plate opening 14 and the base portion 131 of the gripping plate 13 is secured to a lower edge of the gripping plate opening 14. Therefore, the spring plate 15 and the upper stopper 18 are formed in situ when punching or stamping the side panel 1 to form the gripping plate 13.

Figure 4:
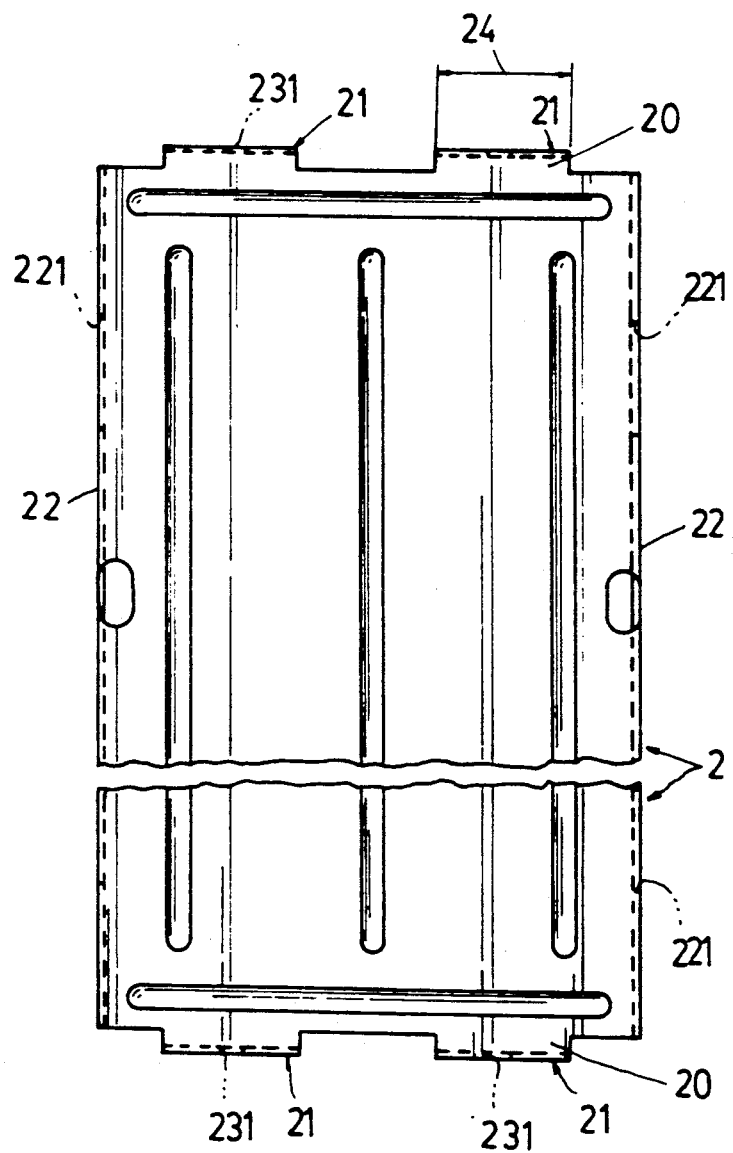
FIG. 4 is a top view of a horizontal plank of the present invention.
Figure 5:
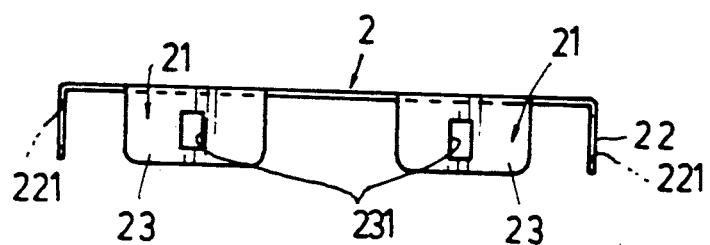
FIG. 5 is a side view of the horizontal plank of the present invention.

Each horizontal plank 2 as shown in FIGS. 4-6 includes: at least two side lugs 21 formed on a right side and a left side of the horizontal plank 2 each side lug 21 interlockably engageable with each gripping plate 13 formed on the side panel 1, and two longitudinal flanges 22 formed on a front edge and a rear edge of the horizontal plank 2. Each flange 22 may be formed with a plurality of hanging holes 221 therein for hanging articles (not shown) on the shank 2.

Figures 8, 11:
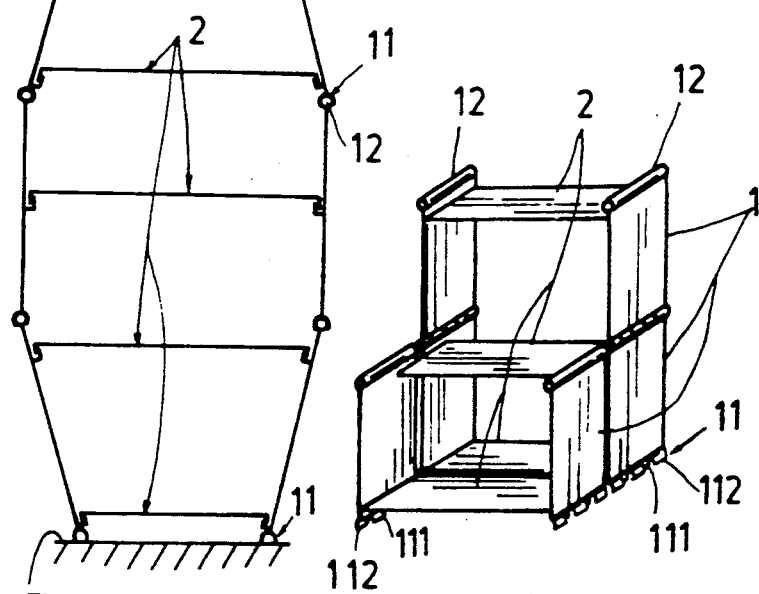
FIG. 8 shows another shelf assembled in accordance with the present invention.
FIG. 11 shows still another skeleton of an assembled shelf of the present invention.

Each side lug 21 includes a horizontal extension 20 protruding sidewardly outwardly from the horizontal plank 2 and a pendent lip 23 secured with the horizontal extension 20 formed with an engaging slot 231 in the pendent lip 23 engageable with the convex portion 17 formed on the gripping plate 13 of the side panel 1. The pendent lip 23 is generally perpendicular to the horizontal extension 20 and may be slightly bent obliquely as shown in FIG. 11. As shown in FIG. 6A, each horizontal extension 20 may also be directly punched to form a spring plate 201 having a concave portion 202 recessed downwardly to be engaged with a notch 19 formed in the gripping plate 13.

The side lug 21 is integrally formed with the horizontal plank 2. For flexibly bending the side lug 21 as shown in FIG. 11, the materials for making the side lug 21 and plank 2 is preferably made of iron or aluminum thin plate having suitable flexibility and toughness.

Naturally, the slot 231 in lug 21 may be alternatively substituted with the convex portion 17 of the gripping plate 13, that is, the pendent lip 23 formed with a convex portion (not shown) thereon to engage a slot in the gripping plate 13.

Figure 7:
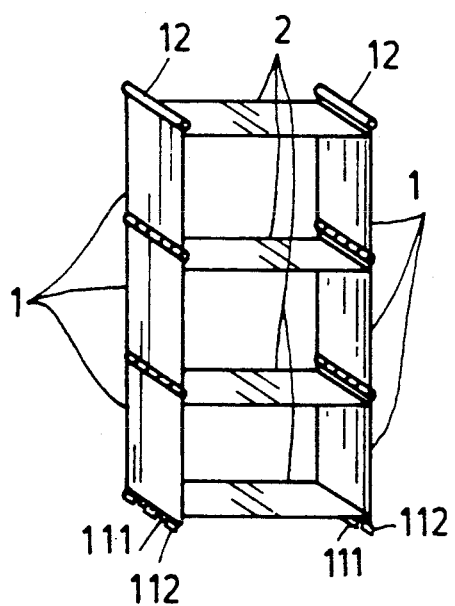
FIG. 7 is an illustration showing an assembled shelf in accordance with the present invention.

When using the present invention for assembling a shelf as shown in FIG. 7, each side lug 21 of the horizontal plank 2 is interlocked with each gripping plate 13 of the side panel 1. Each side panel 1 can be overlapped on another panel 1 to form a shelf with multiple stories for supporting commercial samples, decorative brass items, or other miniature articles for display or ornamental purposes.

Each side lug 21 should have a width 24 (FIG. 4) slightly larger than a width 141 (FIG. 1) of each gripping plate opening 14 to limit a leftward movement of the side lug 21 as shown in (dotted line) FIG. 2. After engaging each side lug 21 with each gripping plate 13, an upward movement of the side lug 21 will be retarded by the upper stopper 18 of the side panel 1, a rightward movement of the side lug 21 will be obstructed by the gripping plate 13, and a downward movement of the side lug 21 will be rested on the base portion 131 of the gripping plate 13 so that the horizontal plank 2 can be firmly stably mounted on the side panel 1. Naturally, this invention is provided for displaying light miniature items, rather than heavy commodities so that it is undoubtful for a stable standing of this invention.

FIG. 8 shows another configuration for forming a diversified shape of a shelf by this invention.

Figure 9:
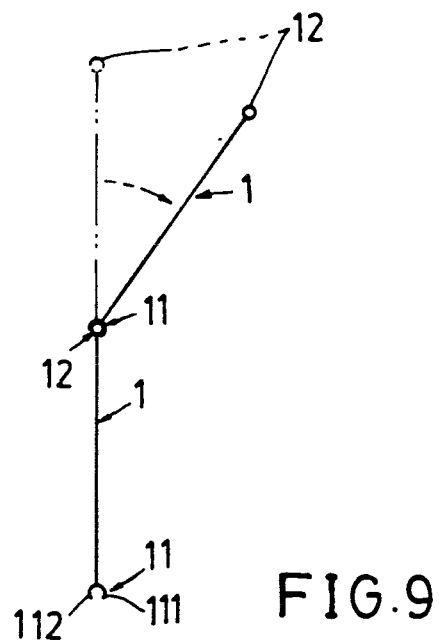
FIG. 9 shows a pivotal movement of two engaged side panels of the present invention.
Figure 10:
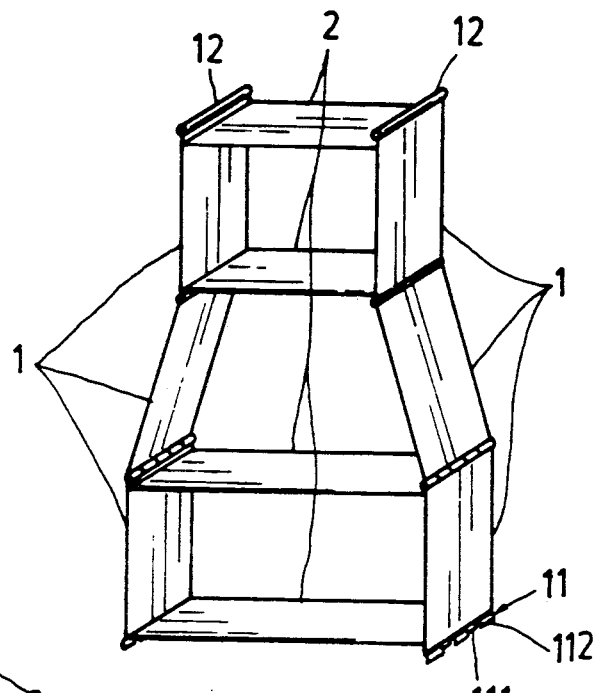
FIG. 10 shows another configuration of an assembled shelf of the present invention.

As shown in FIG. 9, an upper side panel 1 may be pivoted about a lower panel 1 by rotatably pivoting a clip 11 of the upper panel 1 with a securing crimp 12 of a lower panel 1, thereby forming a tilted panel as shown in FIGS. 10, 11. For reinforcing an inclined panel 1 especially as shown in FIG. 11, the side lug 21 of the plank 2 can be slightly bent obliquely when engaged with the gripping plate 13 formed on the side panel 1.

The structures, shapes, and materials of this invention including shapes and numbers of lugs 21 or gripping plates 13 are not limited in this invention.

The present invention is superior to a conventional shelf with the following advantages:

1. No screw, bolt or nail and tool is required for assembling or dismantling the shelf of this invention for a convenient operation and cost saving effect.

2. Diversified configuration or skeleton of shelves can be optionally assembled for much interesting displaying or decorative purpose.

3. After dismantling the planks 2 and panel 1, the volume of this invention can be greatly reduced to be beneficial for material handling or storage.

I claim:

1. A detachable display shelf comprising:
 a plurality of side panels assembled with a plurality of horizontal planks, each said horizontal plank horizontally secured between a right and a left side panel;
 each said side panel including a supporting clip formed on a lower portion of said side panel, a securing crimp formed on an upper portion of said side panel pivotally and releasably engaged in series with a supporting clip of another side panel, and at least two gripping plates integrally formed on said side panel; and
 each said horizontal plank including at least two side lugs formed on a left side and a right side of said plank each said side lug releasably interlocked with each said gripping plate formed on said side panel;
 each said supporting clip including a plurality of first leaf portions respectively arcuately protruding inwardly from a lower portion of the side panel, and a plurality of second leaf portions respectively arcuately protruding outwardly from the lower portion of the side panel, each first leaf portion being adjacent to each second leaf portion to form an arcuate clip when projectively viewed from a side view of the side panel;
 each said gripping plate having a longitudinal section generally L-shaped including: a base portion protruding inwardly from the side panel for integrally connecting the gripping plate generally perpendicular to the base portion and parallel to the side panel, a spring plate resiliently secured to the gripping plate having a convex portion protruding outwardly from the gripping plate, and an upper stopper formed on the side panel above the gripping plate, said gripping plate directly punched from the side panel to form a gripping-plate opening in the side panel, and the spring plate directly punched from the gripping plate to form a central slot in the gripping plate, and the upper stopper directly punched from the side panel to form a stopper notch in the gripping plate when punching the side panel to form the gripping plate so as to secure said upper stopper to an upper edge of the gripping plate opening and to secure the base portion of the gripping plate to a lower edge of the gripping plate opening;
 each said side lug of said horizontal plank including a horizontal extension protruding sidewardly outwardly from the horizontal plank and a pendent lip secured with the horizontal extension formed with an engaging slot in the pendent lip releasably engaged with the convex portion formed on the gripping plate of the side panel, said pendent lip generally perpendicular to the horizontal extension capable of being bent obliquely from said horizontal extension.

2. A shelf according to claim 1, wherein each said horizontal extension of each said side lug includes a horizontal spring plate directly punched in said horizontal extension having a concave portion recessed downwardly on said horizontal spring plate to be releasably engaged with said stopper notch formed in each said gripping plate.

* * * * *